(12) United States Patent
Breese et al.

(10) Patent No.: US 7,047,291 B2
(45) Date of Patent: May 16, 2006

(54) SYSTEM FOR CORRELATING EVENTS GENERATED BY APPLICATION AND COMPONENT PROBES WHEN PERFORMANCE PROBLEMS ARE IDENTIFIED

(75) Inventors: Stephen S. Breese, Morrisville, NC (US); Stig Arne Olsson, Apex, NC (US); Geetha Vijayan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 680 days.

(21) Appl. No.: 10/122,001

(22) Filed: Apr. 11, 2002

(65) Prior Publication Data

US 2003/0195961 A1  Oct. 16, 2003

(51) Int. Cl.
*G06F 15/173* (2006.01)

(52) U.S. Cl. ........................ 709/223; 709/224
(58) Field of Classification Search ................ 709/224, 709/203, 223
See application file for complete search history.

(56) References Cited

U.S. PATENT DOCUMENTS

| | | | |
|---|---|---|---|
| 5,459,837 A | 10/1995 | Caccavale | |
| 5,742,819 A | 4/1998 | Caccavale | |
| 5,787,254 A | 7/1998 | Maddalozzo, Jr. et al. | |
| 5,793,753 A | 8/1998 | Hershey et al. | |
| 5,812,780 A | 9/1998 | Chen et al. | |
| 5,872,973 A | 2/1999 | Mitchell et al. | |
| 6,000,045 A | 12/1999 | Lewis | |
| 6,055,493 A * | 4/2000 | Ries et al. | 702/186 |
| 6,070,190 A * | 5/2000 | Reps et al. | 709/224 |
| 6,078,956 A | 6/2000 | Bryant et al. | |
| 6,108,700 A | 8/2000 | Maccabee et al. | |
| 6,141,699 A | 10/2000 | Luzzi et al. | |
| 6,151,688 A | 11/2000 | Wipfel et al. | |
| 6,175,832 B1 | 1/2001 | Luzzi et al. | |
| 6,177,886 B1 | 1/2001 | Billington et al. | |
| 6,278,694 B1 | 8/2001 | Wolf et al. | |
| 6,278,966 B1 | 8/2001 | Howard et al. | |
| 6,327,550 B1 | 12/2001 | Vinberg et al. | |
| 6,356,205 B1 | 3/2002 | Salvo et al. | |
| 6,401,119 B1 | 6/2002 | Fuss et al. | |
| 6,425,006 B1 | 7/2002 | Chari et al. | |
| 6,430,712 B1 | 8/2002 | Lewis | |
| 6,449,739 B1 | 9/2002 | Landan | |
| 6,457,143 B1 | 9/2002 | Yue | |
| 6,587,878 B1 | 7/2003 | Merriam | |
| 6,732,168 B1 | 5/2004 | Bearden et al. | |

(Continued)

OTHER PUBLICATIONS

Gaidioz et al., "Synchronizing Network Probes to avoid Measurement Intrusiveness with the Network Weather Service", 2000, www.cs.utk.edu/~rich/publications/nws-period.ps.gz, pp. 1-9.

(Continued)

*Primary Examiner*—Le Hien Luu
(74) *Attorney, Agent, or Firm*—Stephen J. Walder, Jr.; David A. Mims, Jr.

(57) ABSTRACT

An example of a solution provided here comprises providing input from probes, with the input including events generated by an application probe, and events generated by a component probe, and correlating the events. Another example of the solutions provided comprises representing components and events with structured identifiers, each having a limited number of parameters. Methods for end to end component mapping and problem-solving in a network environment, systems for executing such methods, and instructions on a computer-usable medium, for executing such methods, are provided.

32 Claims, 5 Drawing Sheets

U.S. PATENT DOCUMENTS

| | | |
|---|---|---|
| 6,763,380 B1 | 7/2004 | Mayton et al. |
| 6,765,864 B1 | 7/2004 | Natarajan et al. |
| 6,766,368 B1 | 7/2004 | Jakobson et al. |
| 6,779,032 B1 | 8/2004 | Hericourt |
| 6,792,455 B1 | 9/2004 | DeLuca et al. |
| 6,807,156 B1 | 10/2004 | Veres et al. |
| 6,832,341 B1 | 12/2004 | Vijayan |
| 6,853,619 B1 | 2/2005 | Grenot |
| 6,857,020 B1 | 2/2005 | Chaar et al. |
| 6,871,324 B1 | 3/2005 | Hand et al. |
| 6,885,302 B1 | 4/2005 | Seal et al. |
| 6,889,222 B1 | 5/2005 | Zhao |
| 6,892,235 B1 | 5/2005 | Daude et al. |
| 6,901,442 B1 | 5/2005 | Schwaller et al. |
| 6,904,458 B1 | 6/2005 | Bishop et al. |
| 6,928,471 B1 | 8/2005 | Pabari et al. |
| 6,934,745 B1 | 8/2005 | Krautkremer |
| 6,944,673 B1 | 9/2005 | Malan et al. |
| 2002/0004828 A1* | 1/2002 | Davis et al. ............... 709/223 |
| 2002/0073195 A1* | 6/2002 | Hellerstein et al. ......... 709/224 |
| 2002/0087882 A1* | 7/2002 | Schneier et al. ............ 713/201 |
| 2002/0161875 A1* | 10/2002 | Raymond .................. 709/223 |
| 2003/0061232 A1* | 3/2003 | Patterson ................. 707/104.1 |
| 2003/0145079 A1* | 7/2003 | Breese et al. .............. 709/224 |
| 2003/0145080 A1 | 7/2003 | Breese et al. |
| 2003/0167406 A1* | 9/2003 | Beavers ...................... 713/201 |
| 2004/0064546 A1 | 4/2004 | Olsson et al. |
| 2004/0078684 A1* | 4/2004 | Friedman et al. ............. 714/38 |
| 2004/0205184 A1 | 10/2004 | Olsson et al. |

OTHER PUBLICATIONS

Clark et al., "Application-Level Measurements of Performance on the vBNS", 1999, www.cs.unc.edu/~jeffay/papers/ICMCS-99.ps, 5 pages.

Sekar et al., "A High-Performance Network Intrusion Detection System", 1999, www.seclab.cs.sunysb.edu/sekar/papers/ccs99.ps, 10 pages.

Adiseshu et al., "A State Management Protocol for IntServ, DiffServ, and Label Switching", 1998, www.ccrc.wustl.edu/~hari/icnp.ps, pp. 1-24.

Mercury Interactive Corporation, "Products and Services/Testing," web page available at www.mercuryinteractive.com, 2001.

Mercury Interactive Corporation, "Load Testing Monitors," web page available at www.mercuryinteractive.com, 2001.

Mercury Interactive Corporation, "Quick Test Professional," data sheet available at www.mercuryinteractive.com, 2001.

Atesto Technologies, Inc., "How does FunctionChecker work?" web page available at http://www.atesto.com/solutions_func_test_how_it_works.asp, 2001.

Atesto Technologies, Inc., "Functional and Regression Testing," web page available at http://www.atesto.com/solutions_automated_fun_test.asp., 2001.

Freshwater Software, "SiteSeer Example Reports," http://www.freshwatersoftware.com/SiteSeerReports.htm, 2001.

Reading Management Reports, web page available at http://demo.freshwater.com/SiteScope/docs/History.htm, 2001.

Holistix, "Holistix Web Manager," web page available at http://www.holistix.net/products/webmgr/. 2001.

Holistix, "Holistix Web Manager Reporting," web page available at http://www.holistix.net/products/webmgr/reporting.html, 2001.

Holistix, "Response time and performance thresholds," web page available at http://www.holistix.net/products/webmgr/url_response_time_chart.html, 2001.

Holistix, "Correlating response time to site availability," web page available at http://www.holistix.net/products/webmgr/avail_by_monitor.html., 2001.

Keynote, "Test Perspective," web page available at http://www.keynote.com/solutions/html/test_works.html., 2001.

Keynote, "The Keynote Solution," web page available at http://www.keynote.com/solutions/html/resource_transaction_perspecti.html., 2001.

Tweney, "The Need for Speed," *Business 2.0*, vol. 2, No. 7, Aug./Sep. 2001, pp. 144-145.

Paxson et al., "An Architecture for Large-Scale Internet Measurement", 1998, ftp.ee.lbl.gov/papers/nimi-ieee-comm98.ps.gz, pp. 1-9.

Phillips et al., "The FERET Evaluation Methodology for Face-Recognition Algorithms", 1999, sequoyah.ncsl.nist.gov/pub/nist_internal_reports/ir_6264.ps.Z, pp. 1-20.

Ruspini et al., "The Haptic Display of Complex Graphical Environments", 1997, robotics.stanford.edu/people/krasi/Siggraph97.ps.Z, 8 pages.

Blott et al., "User-Level Billing and Accounting in IP Networks", 1999, www.bell-labs.com/user/blott/BLTJ00.pdf, pp. 1-15.

Dykes et al., "An Empirical Evaluation of Client-side Server Selection Algorithms", 2000, www.ieee-infocom.org/2000/papers/700.pdf, 10 pages.

Vigna, "NetSTAT: A Network-based Intrusion Detection Approach", 1998, www.cs.ucsb.edu/~vigna/pub/vigna_kemmerer_acsac98.ps.gz, 10 pages.

Kung et al., "TCP Trunking for Bandwidth Management of Aggregate Traffic", 2000, www.eecs.harvard.edu/~htk/publication/2000-kung-wang-tcp-trunking-1100.pdf, pp. 1-12.

Parulkar, "An Architecture for Monitoring, Visualization and Control of Gigabit Networks", 1997, www.cs.wustl.edu/~schmidt/PDF/NMVC.pdf, pp. 1-21.

* cited by examiner

SYSTEM FOR CORRELATING EVENTS GENERATED BY APPLICATION AND COMPONENT PROBES WHEN PERFORMANCE PROBLEMS ARE IDENTIFIED

CROSS-REFERENCES TO RELATED APPLICATIONS, AND COPYRIGHT NOTICE

The present application is related to co-pending applications entitled Method and System for Probing in a Network Environment, application Ser. No. 10/062,329, filed on Jan. 31, 2002, Method and System for Performance Reporting in a Network Environment, application Ser. No. 10/062,369, filed on Jan. 31, 2002, and Graphics for End to End Component Mapping and Problem-Solving in a Network Environment, filed on even date herewith. These co-pending applications are assigned to the assignee of the present application, and herein incorporated by reference. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to information handling, and more particularly to end to end component mapping and problem
solving, for information handling in a network environment.

BACKGROUND OF THE INVENTION

Various approaches have been proposed for monitoring, simulating, or testing web sites. Examples include U.S. Pat. No. 6,278,966 B1 (Howard, et al., Aug. 21, 2001), "Method and System for Emulating Web Site Traffic to Identify Web Site Usage Patterns." However, this example addresses substantially different problems (problems of simulation and hypothetical phenomena), and thus is significantly different from the present invention. Other examples include U.S. Pat. No. 6,078,956 (Bryant, et al., Jun. 20, 2000) and U.S. Pat. No. 5,787,254 (Maddalozzo, et al., Jul. 28, 1998). Other examples include services available from vendors such as Atesto Technologies Inc., Keynote Systems, and Mercury Interactive Corporation. These services may involve a script that runs on a probe computer. The examples mentioned above do not necessarily provide means for directing problem-solving efforts.

A wide variety of valuable services are provided through client-server applications, so proper performance of these applications may be very important. When a problem occurs, lack of useful information can hamper efforts to restore the proper performance of a client-server application. These applications may involve many hardware and software components in a network environment, so it may be difficult to quickly identify a component that is causing a problem. Thus there is a need for systems and methods that provide information to properly focus problem-solving efforts for client-server applications, including but not limited to web sites and web services.

SUMMARY OF THE INVENTION

An example of a solution to problems mentioned above comprises providing input from probes, with the input including events generated by an application probe, and events generated by a component probe, and correlating the events. This example solution may further comprise identifying a component problem that is a cause of a performance problem affecting a user of a client-server application.

Another example of the solutions provided comprises representing components and events with structured identifiers, each having a limited number of parameters. This example solution may further comprise employing the identifiers to do one or more tasks such as inputting data, storing data, outputting data and relating an event to a corrective action.

BRIEF DESCRIPTION OF THE DRAWINGS

A better understanding of the present invention can be obtained when the following detailed description is considered in conjunction with the following drawings. The use of the same reference symbols in different drawings indicates similar or identical items.

DETAILED DESCRIPTION

Figure 1:
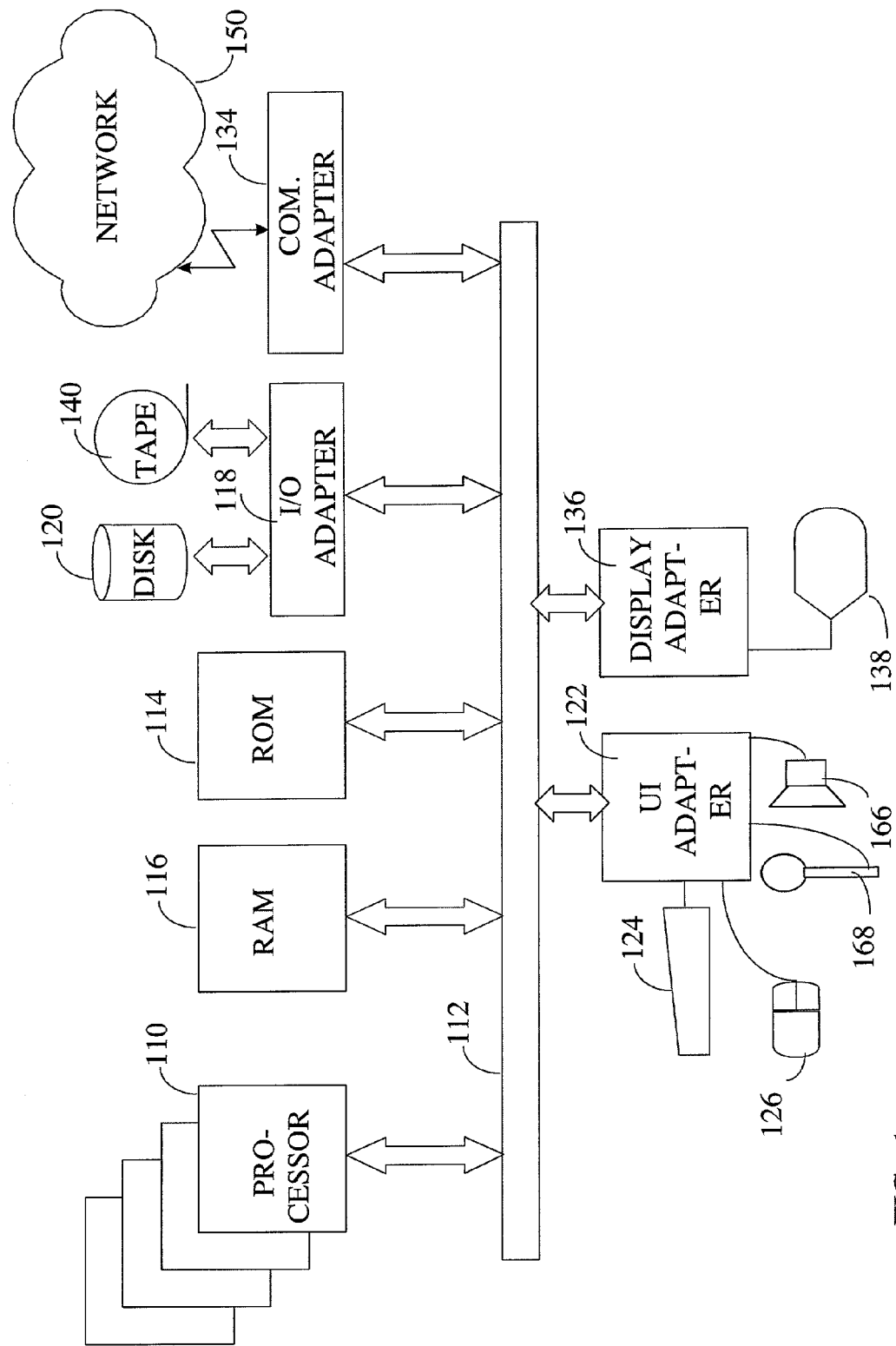
FIG. 1 illustrates a simplified example of an information handling system that may be used to practice the present invention.

The examples that follow involve the use of one or more computers and may involve the use of one or more communications networks. The present invention is not limited as to the type of computer on which it runs, and not limited as to the type of network used.

The following are definitions of terms used in the description of the present invention and in the claims:

"Availability" means ability to be accessed or used.

"Business process" means any process involving use of a computer by any enterprise, group, or organization; the process may involve providing goods or services of any kind.

"Client-server application" means any application involving a client that utilizes a service, and a server that provides a service. Examples of such a service include but are not limited to: information services, transactional services, access to databases, and access to audio or video content.

"Comparing" means bringing together for the purpose of finding any likeness or difference, including a quantitative likeness or difference. "Comparing" may involve answering questions including but not limited to: "Is a measured response time greater than a threshold response time?" Or "Is a response time measured by a remote probe significantly greater than a response time measured by a local probe?"

"Component" means any element or part, and may include elements consisting of hardware or software or both.

"Computer-usable medium" means any carrier wave, signal or transmission facility for communication with computers, and any kind of computer memory, such as floppy disks, hard disks, Random Access Memory (RAM), Read Only Memory (ROM), CD-ROM, flash ROM, non-volatile ROM, and non-volatile memory.

"Measuring" means evaluating or quantifying.

"Event" means any action initiated by a computer or a user, including the sending of alerts, warnings, or other signals.

"Outputting" means producing, transmitting, or turning out in some manner, including but not limited to printing on paper, or displaying on a screen, or using an audio device.

"Performance" means execution or doing; "performance" may refer to any aspect of an application's operation, including availability, response time, time to complete batch processing or other aspects.

"Probe" means any computer used in evaluating, investigating, or quantifying the functioning of a component or the performance of an application; for example a "probe" may be a personal computer executing a script, acting as a client, and requesting services from a server.

"Response time" means elapsed time in responding to a request or signal.

"Script" means any program used in evaluating, investigating, or quantifying performance; for example a script may cause a computer to send requests or signals according to a transaction scenario. A script may be written in a scripting language such as Perl or some other programming language.

"Service level agreement" means any oral or written agreement between provider and user. For example, "service level agreement" includes but is not limited to an agreement between vendor and customer, and an agreement between an information technology department and an end user. For example, a "service level agreement" might involve one or more client-server applications, and might include specifications regarding availability, response times or problem-solving.

"Storing" data or information, using a computer, means placing the data or information, for any length of time, in any kind of computer memory, such as floppy disks, hard disks, Random Access Memory (RAM), Read Only Memory (ROM), CD-ROM, flash ROM, non-volatile ROM, and non-volatile memory.

"Structured identifier" means any definition, label, tag, or other means of identifying something, with a certain arrangement or order.

"Threshold value" means any value used as a borderline, standard, or target; for example, a "threshold value" may be derived from a service level agreement, industry norms, or other sources.

FIG. 1 illustrates a simplified example of an information handling system that may be used to practice the present invention. The invention may be implemented on a variety of hardware platforms, including embedded systems, personal computers, workstations, servers, and mainframes. The computer system of FIG. 1 has at least one processor 110. Processor 110 is interconnected via system bus 112 to random access memory (RAM) 116, read only memory (ROM) 114, and input/output (I/O) adapter 118 for connecting peripheral devices such as disk unit 120 and tape drive 140 to bus 112. The system has user interface adapter 122 for connecting keyboard 124, mouse 126, or other user interface devices such as audio output device 166 and audio input device 168 to bus 112. The system has communication adapter 134 for connecting the information handling system to a data processing network 150, and display adapter 136 for connecting bus 112 to display device 138. Communication adapter 134 may link the system depicted in FIG. 1 with hundreds or even thousands of similar systems, or other devices, such as remote printers, remote servers, or remote storage units. The system depicted in FIG. 1 may be linked to both local area networks (sometimes referred to as Intranets) and wide area networks, such as the Internet.

While the computer system described in FIG. 1 is capable of executing the processes described herein, this computer system is simply one example of a computer system. Those skilled in the art will appreciate that many other computer system designs are capable of performing the processes described herein.

Figure 2:
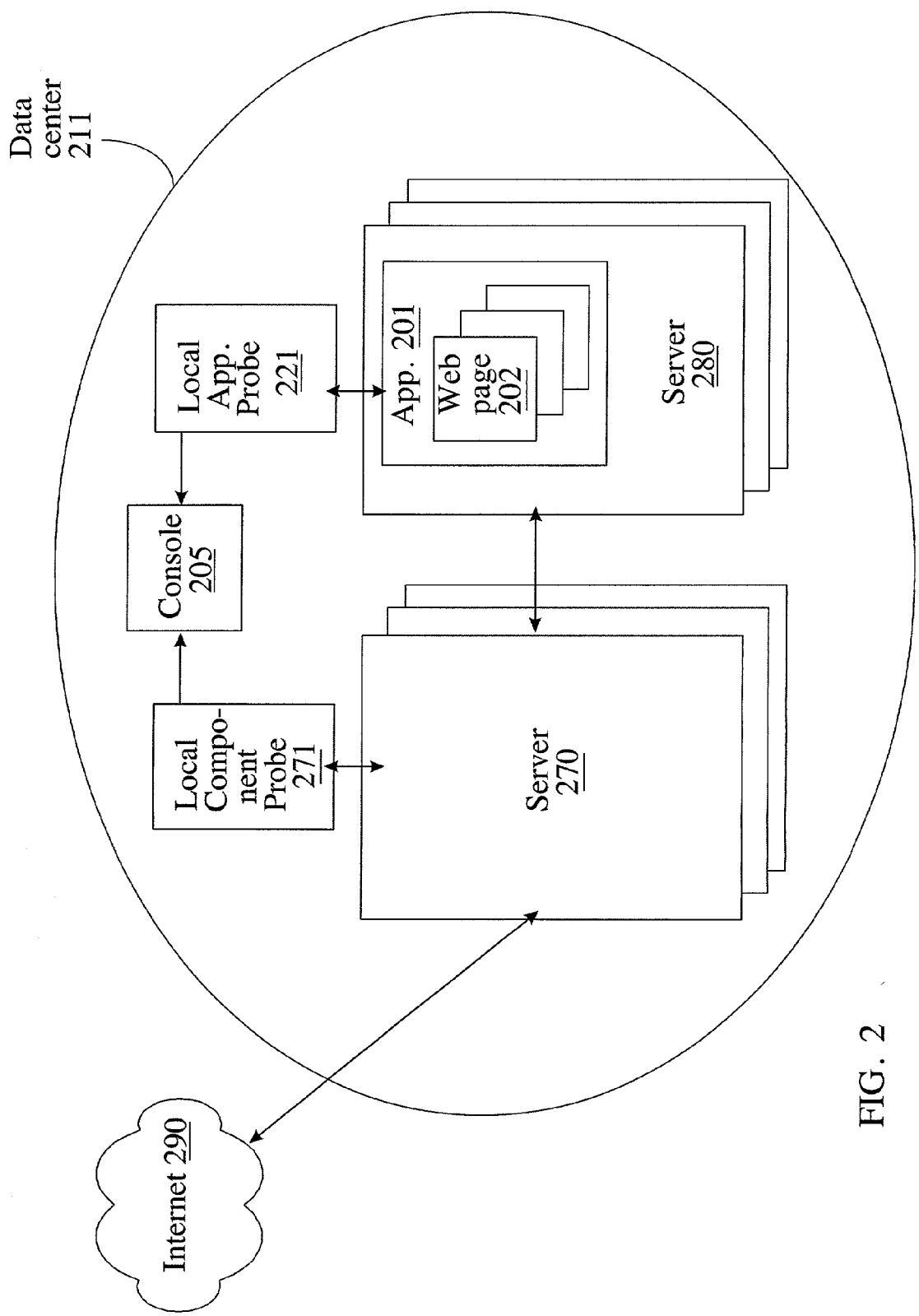
FIG. 2 is a block diagram illustrating one example of how the present invention was implemented in a data center that hosted a web site.

FIG. 2 is a block diagram illustrating one example of how the present invention was implemented in a data center that hosted a web site. FIG. 2 shows a simplified example of a typical e-business infrastructure, including a variety of network, server, and middleware components. These components are symbolized by server 270, server 280, and the boxes visible behind server 270 and server 280. As an overview, this example comprised: providing input from a plurality of probes, including events (symbolized by arrows pointing to console 205) generated by at least one application probe (shown at 221) and at least one component probe (shown at 271); and correlating the events. FIG. 2 shows application probe 221 and component probe 271 providing input (symbolized by arrows) to console 205, which was used in correlating the events.

Turning now to some details of the example implementation, application probes such as probe 221 measured response time for requests. The double-headed arrow connecting local application probe 221 with application 201 symbolizes requests and responses.

We located application probes locally at hosting sites (e.g. local application probe shown at 221, within data center 211) and remotely at relevant end-user sites (not shown in this diagram). This not only exercised the application code and application hosting site infrastructure, but also probed the ability of the application and network to deliver data from the application hosting site to the remote end-user sites. End-to-end measurement of IBM external applications (symbolized by application 201 with web pages 202) for customers or business partners, for example, involved remote application probes (RAP's) on the Internet (shown at 290). We also measured the availability and performance of the application at the location where it was deployed (local application probe shown at 221, within data center 211). This provided baseline performance measurement data, that could be used for analyzing the performance measurements from the remote probes (not shown in this diagram).

Local application probe 221 was implemented with a personal computer, utilizing IBM's Enterprise Probe Platform technology, but other kinds of hardware and software could be used. A local application probe 221 was placed on the IBM network just outside the firewall at the center where the web site was hosted. A local application probe 221 was used to probe one specific site per probe. There could be multiple scripts per site. A local application probe 221 executed the script every 20 minutes. Intervals of other lengths also could be used.

Component probe 271 could be implemented with a personal computer running a script, but other kinds of hardware and software could be used. Component probe 271 could be implemented with software products (such as those available from TIVOLI, for example, or other similar products). These products provide a framework for probing infrastructure components. These products are available for various operating systems and middle ware components.

Another aspect of this example in FIG. 2 was providing an alert (i.e. an event signaling a problem) when probe 221 or probe 271 detected an error. An example of an error in application 201 would be a measured response time value greater than a corresponding threshold value. For example, if a local application probe 221 encountered a problem (e.g. it was unable to access the site or unable to complete the script) on two consecutive executions of the script, local application probe 221 generated a real time alert (problem event, symbolized by arrow pointing to console 205), and sent it to a TIVOLI management system (shown as console 205). Another similar kind of management system could be used. Thus an alert was provided via a system management computer. An alert message via email also could be used. Similarly, component probe 271 generated a problem event (symbolized by arrow pointing to console 205) when a component problem was detected.

Turning now to some details of providing input from a plurality of probes, Component Probes measure availability, utilization and performance of infrastructure components, including servers, LAN, and services. Local component probes (LCPs) may be deployed locally in hosting sites, service delivery centers or data centers (e.g. at 211).

Network Probes measure network infrastructure response time and availability. Remote Network Probes (RNPs) may be deployed in a local hosting site or data center (e.g. at 211) if measuring the intranet or at Internet Service Provider (ISP) sites if measuring the Internet.

Application Probes measure availability and performance of applications and business processes.

Local Application Probe (LAP): Application probes deployed in a local hosting site or data center (e.g. at 211) are termed Local Application Probes.

Remote Application Probe (RAP): An application probe deployed from a remote location is termed a Remote Application Probe.

The concept of "probe" is a logical one. Thus for example, implementing a local component probe could actually consist of implementing multiple physical probes.

Providing a script for an application probe would comprise defining a set of transactions that are frequently performed by end users. Employing a plurality of application probes would comprise placing at least one remote application probe (not shown in FIG. 2) at each location having a relatively large population of end users. Note that the Remote Application Probe transactions and Local Application Probe transactions should be the same transactions. The example measured all the transactions locally (shown at 221), so that the local application response time can be compared to the remote application response time. This can provide insight regarding application performance issues. End-to-end measurement of an organization's internal applications for internal customers will involve a RAP on an intranet, whereas end-to-end measurement of an organization's external applications for customers, business partners, suppliers, etc. will involve a RAP on the Internet (shown at 290). The example involved defining a representative transaction set, and deploying remote application probes at relevant end-user locations. (This simplicity is something that can only be appreciated when this example is contrasted with other more complicated models.) A benefit following from the simplicity of this example is that it is easily generalized to other environments besides web based applications. Application 201 may be any client-server application. Some examples are a web site, a web application, database management software, a customer relationship management system, an enterprise resource planning system, or an opportunity-management business process where a client directly connects to a server.

The example in FIG. 2 comprised providing an alert when an error occurred. The alert may be provided via email, for example, or may be provided in real time via a network and a system management computer 205. A clearing message may be provided when the error no longer is detected. In the example shown in FIG. 2, local application probe 221 generated a real time alert (problem event), and sent it to a TIVOLI management system (shown as console 205). Another similar kind of management system could be used.

The local application probe 221 automatically sent events to the management console 205 used by the operations department. In the example solution, integration was provided with the TIVOLI MANAGEMENT ENVIRONMENT and the TIVOLI EVENT CONSOLE product. The example solution generated events from the local application probe 221, and the events were generated after two consecutive errors on the same step in the business process. This could then be adjusted to send an event on the first error, for even faster notification. The recommendation is to send events on the second occurrence initially and then adjust to sending the event on the first occurrence as the environment becomes more stable and better understood by the operational staff. The reason for the recommendation is that in a Web environment there are a number of things that can cause intermittent problems, and it is ultimately a business decision when to invoke problem determination procedures.

Consider the following example of a condition where an event was generated. This example involved probing a web site for selling computer hardware. There were executions of the probe script that failed on step two. (Regarding the steps involved, see Table 1 below.) The associated event sent to the TIVOLI ENTERPRISE CONSOLE had a severity of "Warning," and documented the failure of step two, where the probe was unable to log on to the web site. Note that the date and time is the local time from the probe. In the examples below, "CRT" refers to a type of probe technology used by IBM. An example of an alert follows.

Tivoli alert for CRT probe failure:
Tivoli CRT Alert—PC NA
WARNING (NAQS2 [LogonFailed/1])
PCNa—Partner Commerce North America CRT Monitor tag:auth=crtGwaFw tag:message=PartnerCommerceNA https://ecna.partner.com Step-NAQS2-failed: Logon failed.

tag:severity=WARNING tag:slot hostname=d03bpec18.pinfo.com tag:slot mail_svr=CVRM tag:slot mta=ecna.partner.com tag:slot probe_addr=NAQS2 tag:slot probe_date=07/21 tag:slot probe_time=19:58 tag:class=crt_event tag:source=SENTRY

It is useful to automatically close opened events if a subsequent business process is executed successfully. This allows the operational staff to direct time and efforts to those events that remain in "open" status. Below is an example of such an event which was used to automatically close the previously opened event. The event was reported as severity HARMLESS and with the appropriate rules defined on the TIVOLI ENTERPRISE CONSOLE the previously opened event would be closed. This HARMLESS event was generated when the probe successfully executed the script and was able to log on to the web site. An example of such an event follows.

Tivoli alert for CRT probe failure:
Tivoli CRT Alert—PC NA
HARMLESS (NAQS2 [Recoveredzf/0])
PCNa—Partner Commerce North America CRT Monitor tag:auth=crtGwaFw tag:message=PartnerCommerceNA https://ecna.partner.com Step-NAQS2-failed: The problem causing the previous alert has been fixed.

tag:severity=HARMLESS tag:slot hostname=d03 bpec18.pinfo.com tag:slot mail_svr=CVRM tag:slot mta=ecna.partner.com tag:slot probe_addr=NAQS2 tag:slot probe_date=07/21 tag:slot probe_time=21:43 tag:class=crt_event tag:source=SENTRY

Figure 3:
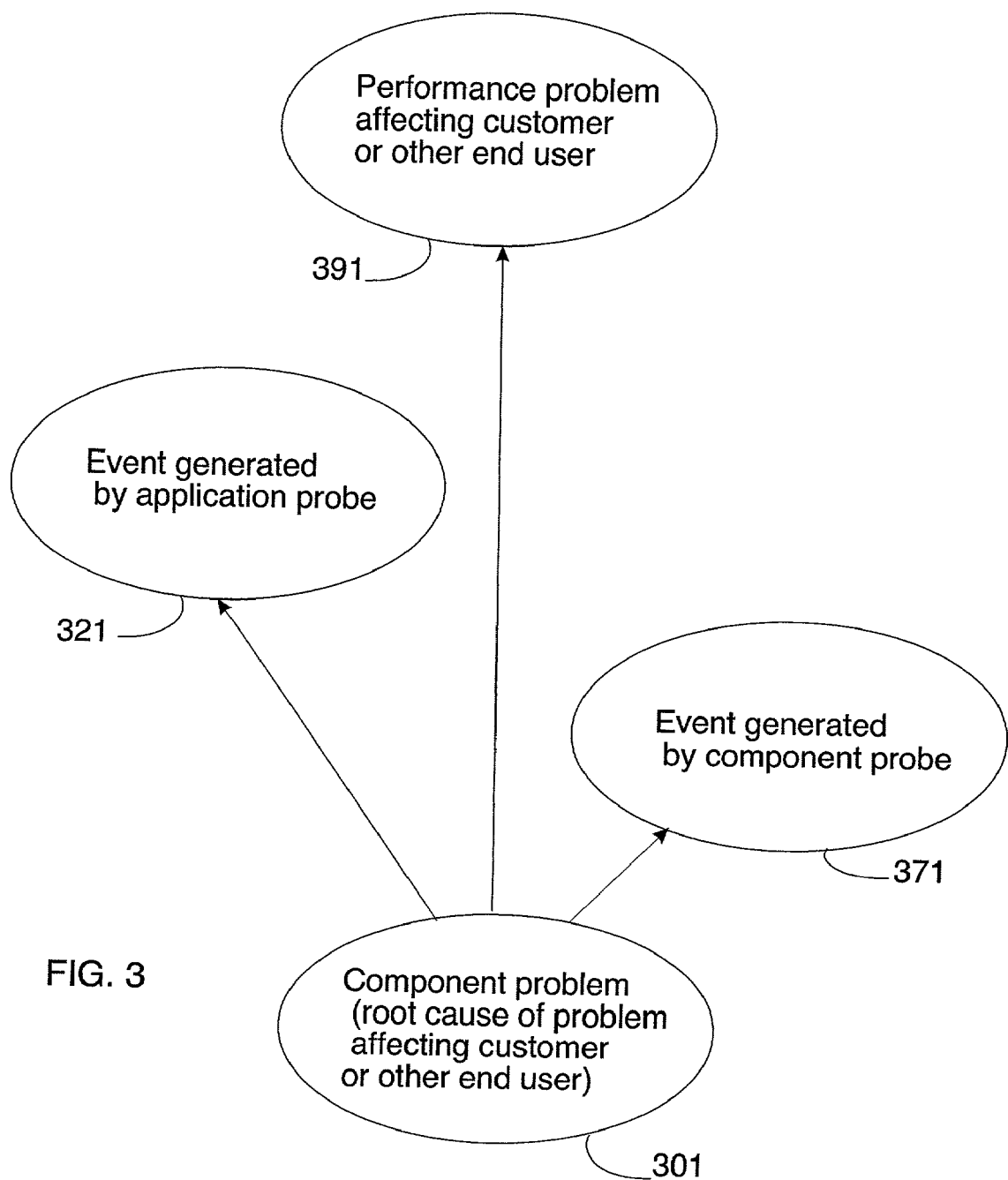
FIG. 3 is a diagram showing an example of identifying a problem with one or more components, according to the present invention.

FIG. 3 is a diagram showing an example of identifying a problem with one or more components, according to the present invention. FIG. 3 illustrates how operational staff may establish relationships among a component problem 301, events 321 and 371 generated by probes, and performance problem 391 that affects a customer or other end user. Methods and systems are provided herein for assisting operational staff in reducing mean time to repair a component problem 301, and thus solve a performance problem 391, for example. In FIG. 3, a component problem 301 is a root cause of a performance problem 391, that affects a user of a client-server application. Component problem 301 is associated with events generated by probes: event 321, generated by an application probe, and event 371, generated by a component probe.

Event 321 signals a performance problem with an application. For example, event 321 might be similar to the problem event described above regarding FIG. 2, where a probe was unable to log on to a web site; or event 321 might be generated when a "time out" problem is encountered at some transaction step. In this example, event 371 might alert operational staff that a disk failure has occurred on a server. In that case, component problem 301 would be a disk failure. Methods and systems are provided herein for correlating events such as event 321 and event 371.

The example in FIG. 3 may involve component problem 301 causing a performance problem 391, that affects a customer of a business. Thus the example in FIG. 3 may involve identifying component problem 301's impact on a business process that employs the component. Instead of a complete failure, performance problem 391 might be a response time that becomes too long to be acceptable for a customer. Such a situation might deserve intervention by operational staff before a complete failure occurs, depending on the importance of a business process that employs the component. Thus the example in FIG. 3 may involve directing problem-solving efforts, or identifying an opportunity to improve the performance of a client-server application, whether or not a complete failure occurs.

Figure 4:
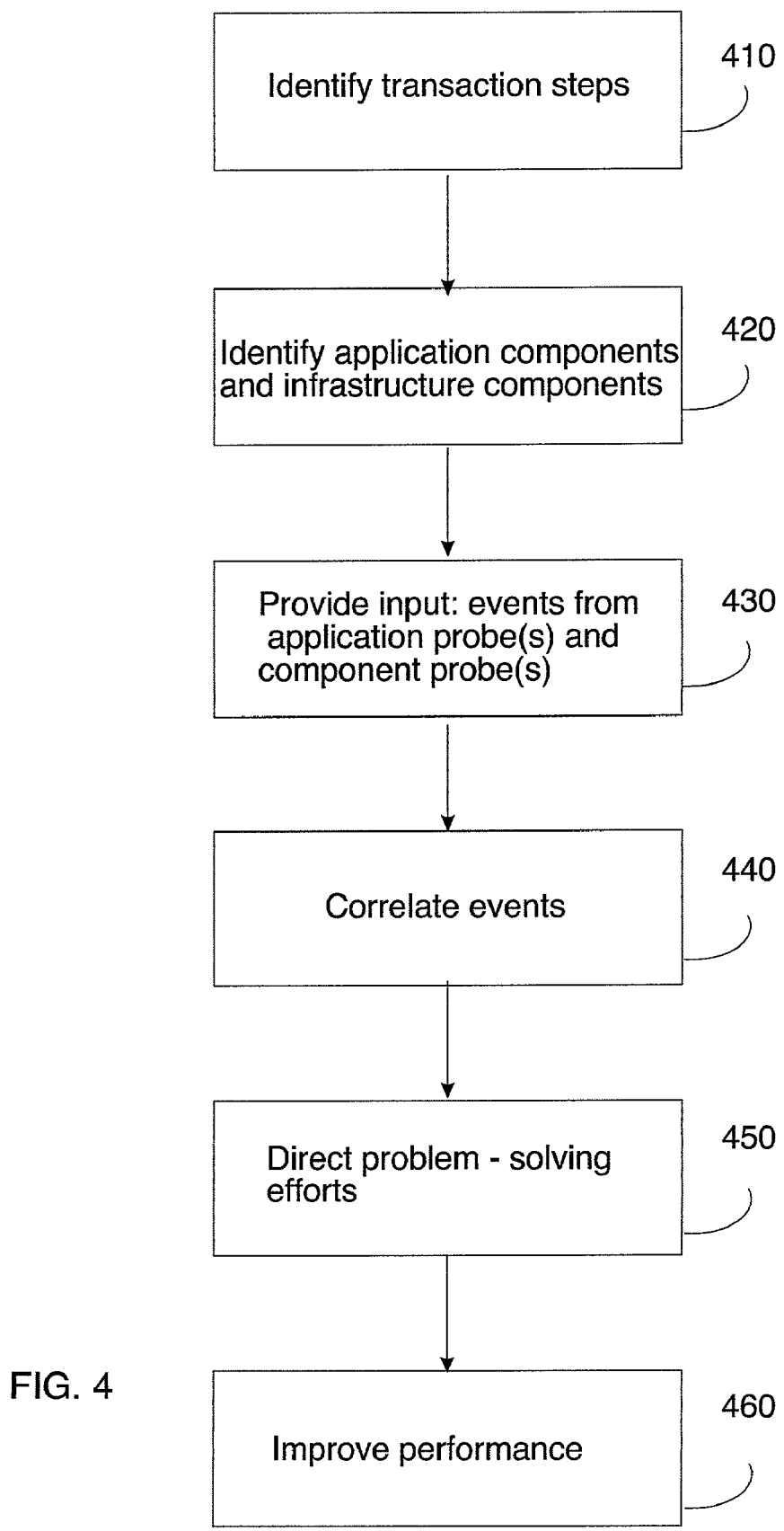
FIG. 4 is a flow chart illustrating one example of how end to end component mapping and problem solving may be implemented in an information technology consulting or design context.

FIG. 4 is a flow chart illustrating one example of how end to end component mapping and problem solving may be implemented in an information technology consulting or design context. This example begins with identifying transaction steps, at block 410. These transaction steps could be any steps that involve a client-server application. Some examples are steps involved in using a web site, a web application, web services, database management software, a customer relationship management system, an enterprise resource planning system, or an opportunity-management business process. The output from identifying transaction steps, at block 410, may be a table containing the transaction step number, step name, and a description of what action the end user takes to execute the step. Table 1 below is an example of such a table, based on a web site for selling computer hardware.

TABLE 1

| Step No. | Step name | Description |
| --- | --- | --- |
| NAQS1 | Open URL | Go to URL http:// |
| NAQS2 | Logon | Enter Login ID/Password. Click on Logon button. |
| NAQS3 | Navigation 1 | Click on Personal Systems and NETFINITY |
| NAQS4 | Clear Form | Select 'Clear the form'. Click "ok" on pop-up window. |
| NAQS5 | Select Catalog | Select Catalog Order from left hand navigation bar |
| NAQS6 | Select Printers | Select Printers |
| NAQS7 | Select Printer Model | Select Infoprint |
| NAQS8 | Add to Order | Type 1 in Quantity box for 1st item Click Add to Order, Click OK on pop-up window |
| NAQS9 | Display Order Form | Click on Go to order form |
| NAQS10 | Validate Order | Click Save/Validate Items |
| NAQS10A | Home Page | Click on "Overview" link |
| NAQS11 | Logoff | Click Logoff. Click "ok" on popup |

Another possible output from identifying transaction steps, at block 410, may be a script to run on a local application probe or remote application probe.

Next in this example in FIG. 4 is block 420, identifying components associated with the transaction steps; this may involve identifying application components and identifying infrastructure components. A variety of network, server, and middle ware components may be identified. This may include resources indirectly involved with transaction steps, such as a link to a back-end system providing data to web site. This link might only be used during the night to push new content to a web site. If the link becomes unavailable, the web site will contain incorrect data. This might cause customer dissatisfaction or loss of revenue.

A possible output from identifying components, at block 420, may be a table containing the transaction step name, the name of an application supporting the step, and the data center where the application is hosted. Table 2 below is an example of such a table.

TABLE 2

| Step name | Supporting Application | Data center |
|---|---|---|
| Open URL | Application 1 | Boulder |
| Logon | Application 2 | Southbury |
| Navigation 1 | Application 1 | Boulder |
| Clear Form | Application 1 | Boulder |
| Select Catalog | Application 1 | Boulder |
| Select Printers | Application 1 | Boulder |
| Select Printer Model | Application 1 | Boulder |
| Add to Order | Application 1 | Boulder |
| Display Order Form | Application 1 | Boulder |
| Validate Order | Application 3 | Portsmouth |
| Home Page | Application 1 | Boulder |
| Logoff | Application 1 | Boulder |

Another example of possible output from identifying components, at block 420, may be a table such as Table 3 below. It identifies infrastructure components that support the individual applications.

TABLE 3

| Application | Infrastructure dependencies | Middleware dependencies | Network dependencies |
|---|---|---|---|
| Application 1 | d0xx2111, d0xx2113, d0xx2115 | MQSeries Channel A | Link 9 |
| Application 2 | d0xx2112 | MQSeries Channel B | Link 9, Link 12 |
| Application 3 | d0xx2119 | DB/2 database Customer data | Link 15 |

Next in this example is block 430, providing input associated with the transaction steps, from a plurality of probes. Typically the input would include at least one event generated by an application probe, and at least one event generated by a component probe. Providing input may further comprise determining specifications to support the deployment of the probes.

Determining specifications may further comprise determining a plurality of specifications such as: a resource specification; a threshold value specification; an event severity specification; and an event class specification. For example, a resource specification would define an infrastructure resource to be probed, such as file space used on a server. A threshold value specification might be "file space 80% full," for example. Examples of event severity specifications "warning" and "harmless" were given above in connection with FIG. 2. Regarding an event class specification, an infrastructure support team might address storage-related problems, and that team's console would be configured to receive the "sentry" class of events, for example. Various kinds of hardware and software resources would require various kinds of specifications to support the deployment of the probes.

Next in this example in FIG. 4 is block 440, correlating events. For example, one may confirm a relationship between an event generated by an application probe, and an event generated by a component probe, as described above in connection with FIG. 3. A tool to help in correlating events is representing each of the components and each of the events with a structured identifier, where each of the identifiers has a limited number of parameters. The parameters typically would include depth, component name, parent component, business process name, and criticality. Other parameters could be used as well. Regarding the depth parameter, for example, one implementation used a hierarchy with a limited number of levels, where Level 0 was the highest level of a business process. Level 6, the lowest level, contained events generated by component probes (e.g. a component probe on server). Some examples of representing each component and each event with a structured identifier are shown below in Table 4. This example involved a business process for customer relationship management called "CRM2000," at Level 0. Each line in Table 4 contains the same business process name, "CRM2000." This allows correlating events, and allows identifying a component problem's impact on a business process that employs the component.

TABLE 4

Examples of structured identifiers for some components and events

| DEPTH/ LEVEL | NAME | PARENT COMPONENT | BUSINESS PROCESS NAME | CRITICALITY |
|---|---|---|---|---|
| 3 | Timeout | Open Leads | CRM2000 | Warning |
| 5 | d0xx | GWA | CRM2000 | Critical |
| 6 | Inetd | d0xx | CRM2000 | Critical |
| 6 | Disk failure | d0xx | CRM2000 | Critical |

Table 4 shows an example using five parameters (depth, name, parent component, business process name, and criticality) to give a logical view of a business process, its components and events. This example used levels numbered from 0 to 6. Level 0 was the highest level of a business process, CRM2000. Level 1 contained components (subprocesses) of CRM2000: "Marketing" and "Sales." Level 2 contained a subprocess of Sales: a "Lead Opportunity Management" application, with a user interface utilized by end users. Level 3 contained transaction steps, and events generated by application probes. Level 4 contained logical components in the infrastructure, such as IBM's Global Web Architecture (GWA), an environment that hosts web servers. Level 5 contained infrastructure components such as servers. Level 6, the lowest level, contained events generated by component probes. Component "d0xx" was a server. "Timeout" was an event generated by an application probe; "Inetd" and "Disk failure" were events generated by component probes.

Variations in the depth parameter are possible. Another example used levels numbered from 0 to 7, where hardware and software classes of components were at Level 6, and the events "Inetd" and "Disk failure" were at Level 7.

The event "Inetd" indicated a problem with a software component (inetd, the Internet super-server daemon, in an operating system such as UNIX, LINUX, or IBM's AIX). The event "Disk failure" indicated a problem with a hardware component (a disk).

In contrast to Table 4, a structured identifier may be expressed in plain text, following this pattern, for example: (Depth, Component Name, Parent Component, Business Process Name, Criticality). For example a software component "inetd" could have the following identifier: (6, inetd, d0xx1, CRM2000, Critical). This identifier identifies the position of each component, and retains the data pertaining to its relationships and dependencies. The same software component "inetd," regarding its utilization in another application or business process called "CVRM," could have the following identifier: (6, inetd, d0xx1, CVRM, Critical).

Some examples of additional parameters that could be used with the five parameters shown above are problem determination, destination, and service level agreement parameters. First, an additional parameter for problem determination (PD) can be added. The purpose of this parameter would be to associate problem determination procedures to every event generated. This parameter could be used to identify the actions or procedures to be used when this event is generated. These actions or procedures can be automatic (e.g. identifying a program or function to be automatically executed when the event occurs). Another implementation could be to use this parameter as an index into an operational repository to retrieve written instructions to be followed to correct the problem. Depending on the missions of different organizations, the operational procedures will vary. In the example in Table 4, where we had a problem with the inetd daemon, the automated PD process could be to run the appropriate shell script to restart the inetd daemon. In the case of a disk crash, the operational procedure could be a reference to a document describing how to replace broken hardware and apply the necessary backup and restore procedures. On depth level 2 the PD parameter could refer to an automated or written process for how the business owner of the process is contacted and informed about the business impact of the infrastructure problem.

A second example would be to add a destination parameter to the event. Most likely several different teams are involved in the management of an end to end business process. These teams have different missions and accordingly different roles and responsibilities. For example an eBusiness Center could have a mission to manage the end to end process from a customer perspective and the service delivery centers could perform traditional information technology services. The destination (i.e. a target audience or event console) parameter could be used to indicate that the event documenting the disk crash has been sent to an event console used by the service delivery center with a responsibility to address infrastructure problems. The service delivery center may receive the disk crash event as CRITICAL. The same event could be sent to different destinations with different values in the criticality parameter, depending on the roles and responsibilities of the target audience. The disk crash event could be sent to the eBusiness Command Center and could have a criticality value of WARNING.

Thirdly, Service Level Agreements (SLA's) are most likely in place for the whole end to end system and in many cases the individual components. Adding an SLA parameter would allow this parameter to be used as an index into a repository of existing SLA's. Again, these SLA's differ based on the missions of the organizations, so the end to end SLA documents the availability agreement for the customer process, and the SLA for infrastructure documents hardware availability etc. Since these SLA's are commitments by the service providers and could impose penalties, it is useful to direct problem resolution activities in accordance with the service level commitments. More sophisticated implementations could include automatic data collection for SLA attainment calculations.

In various situations, various combinations of these parameters may be used. For example, an enterprise could use the problem determination parameter but not the SLA parameter (they may not have an SLA). Another situation could be an enterprise who has an SLA but has not implemented automated or manual operational processes in support of their SLA commitments.

To conclude the description of FIG. 4, next in this example is block 450, directing problem-solving efforts. Some examples of this were given above, regarding parameters and structured identifiers. Finally in this example is block 460, improving performance; typically this would involve identifying an opportunity to improve the performance of one or more client-server applications. For example, performance degradation caused by specific components could be ascertained, and proactive measures could be taken to improve performance.

Figure 5:
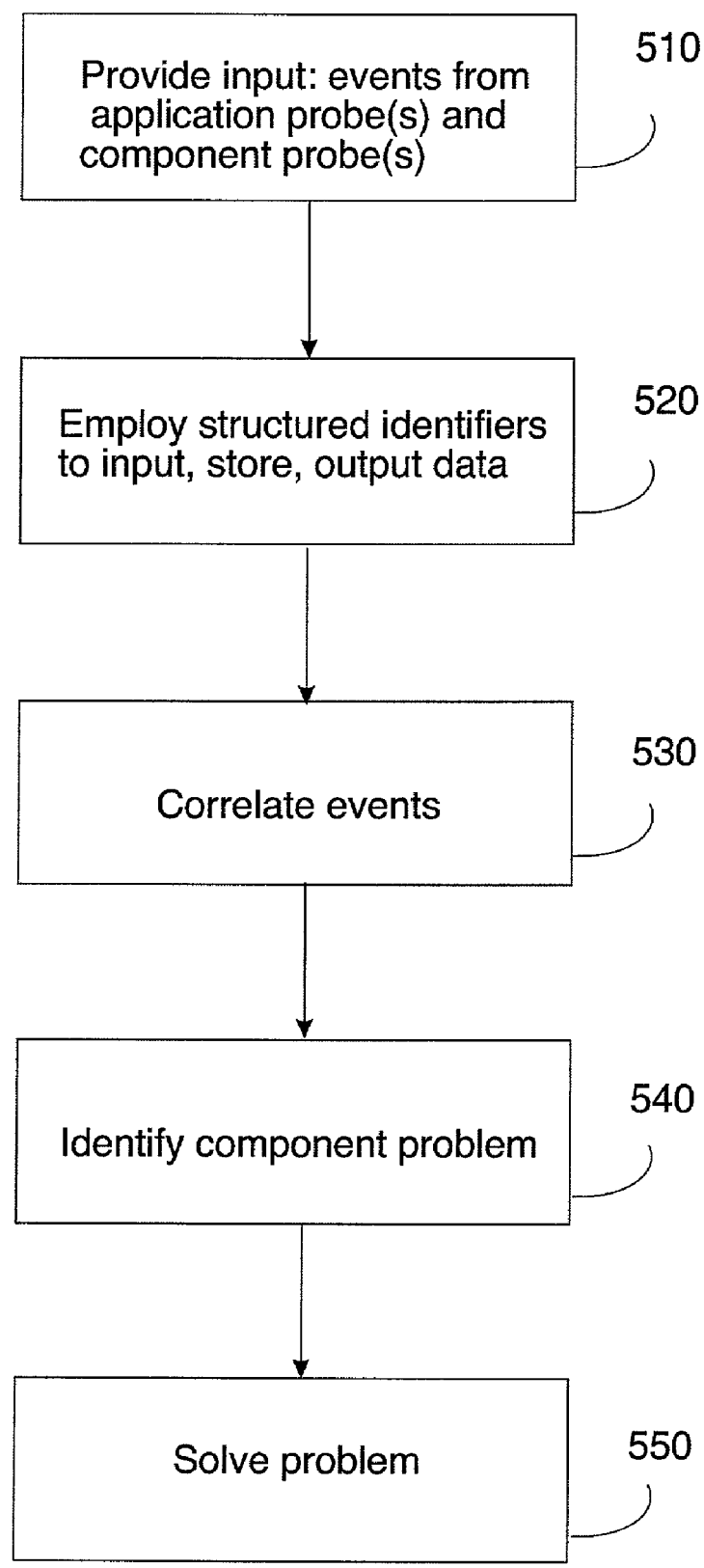
FIG. 5 is a flow chart illustrating one example of how end to end component mapping and problem solving may be implemented in an operations context.

FIG. 5 is a flow chart illustrating one example of how end to end component mapping and problem solving may be implemented in an operations context. This example begins at block 510, with providing input from a plurality of probes. Typically the input would include at least one event generated by an application probe, and at least one event generated by a component probe. Next in this example is block 520, employing structured identifiers. Typically this would involve representing each of the components and each of the events with a structured identifier, where each of the identifiers has a limited number of parameters, as discussed above regarding Table 4. Structured identifiers may be employed to do one or more tasks such as inputting data, storing data, and outputting data. For example, operational staff could use a form similar to Table 4 above for inputting or outputting data. A form similar to Table 4 could be printed on paper or displayed on a screen. Other examples based on Table 4 would be utilizing a data structure in which each component and each event has a unique five-parameter identifier, or utilizing a programming object that includes a five-parameter identifier. Additional parameters could be used, as discussed above, with corresponding variations in forms or data structures.

Next in this example is block 530, correlating events. As discussed above, a tool to help in correlating events is the structured identifier that identifies the position of each component and each event, and retains the data pertaining to its relationships and dependencies. For example, one may confirm a relationship between an event generated by an application probe, and an event generated by a component probe, as described above in connection with FIG. 3.

Next in this example in FIG. 5 is block 540, identifying a component problem, followed by block 550, solving the component problem (and thus solving the performance problem affecting a user of an application). Problem-solving examples involving hardware and software failures were given above, regarding parameters and structured identifiers. In another example mentioned above, performance degradation caused by specific components could be ascertained, and proactive measures could be taken to improve performance.

Those skilled in the art will recognize that blocks in the above-mentioned flow charts could be arranged in a somewhat different order, but still describe the invention. Blocks could be added to the above-mentioned flow charts to describe details, or optional features; some blocks could be subtracted to show a simplified example.

In conclusion, we have shown examples of methods and systems for End to end component mapping and problem-solving in a network environment.

One of the preferred implementations of the invention is an application, namely a set of instructions (program code) in a code module which may, for example, be resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer-usable medium having computer-executable instructions for use in a computer. In addition, although the various methods described are conveniently implemented in a general-purpose computer selectively activated or reconfigured by software, one of ordinary skill in the art would also recognize that such methods may be carried out in hardware, in firmware, or in more specialized apparatus constructed to perform the required method steps.

While the invention has been shown and described with reference to particular embodiments thereof, it will be understood by those skilled in the art that the foregoing and other changes in form and detail may be made therein without departing from the spirit and scope of the invention. The appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the appended claims may contain the introductory phrases at least one or one or more to introduce claim elements. However, the use of such phrases should not be construed to imply that the introduction of a claim element by indefinite articles such as a or an limits any particular claim containing such introduced claim element to inventions containing only one such element, even when the same claim includes the introductory phrases at least one or one or more and indefinite articles such as a or an; the same holds true for the use in the claims of definite articles.

We claim:

1. A method for mapping, said method comprising:
identifying transaction steps involving at least one client-server application;
identifying components associated with said steps;
providing input associated with said steps, from a plurality of probes, said input including:
at least one event generated by an application probe; and
at least one event generated by a component probe; and
correlating said events, wherein the method maps events generated by infrastructure components of a data processing infrastructure with events generated by applications running in said data processing infrastructure, and wherein:
said at least one event generated by an application probe is at least one first event that identifies a performance problem with an application, and wherein said at least one first event is represented by a first structured identifier that identifies a position of said at least one first event within said data processing infrastructure and said at least one first event's relationships and dependencies;
said at least one event generated by a component probe is at least one second event that identifies a performance problem with a component, and wherein said at least one second event is represented by a second structured identifier that identifies a position of said at least one second event within said data processing infrastructure and said at least one second event's relationships and dependencies; and
said correlating of said events is performed based on said first and second structured identifiers.

2. The method of claim 1, further comprising: directing problem-solving efforts.

3. The method of claim 1, further comprising:
identifying an opportunity to improve the performance of said at least one client-server application.

4. The method of claim 1, wherein said identifying components further comprises:
identifying application components; and
identifying infrastructure components.

5. The method of claim 1, wherein said providing input further comprises:
determining specifications to support the deployment of said probes.

6. The method of claim 5, wherein said determining specifications further comprises determining a plurality of specifications chosen from:
a resource specification;
a threshold value specification;
an event severity specification; and
an event class specification.

7. The method of claim 1, further comprising:
representing each of said components and each of said events with a structured identifier;
wherein each of said identifiers has a limited number of parameters.

8. The method of claim 7, wherein said representing further comprises employing a plurality of parameters chosen from:
depth;
component name;
parent component;
business process name;
criticality;
problem determination;
destination; and
service level agreement.

9. The method of claim 1, wherein identifying transaction steps comprises:
outputting a table data structure containing one or more entries corresponding to identified transaction steps, wherein the one or more entries in the table data structure comprise a transaction step number, a transaction step name, and a description of an end user action required to execute the transaction step.

10. The method of claim 1, wherein identifying infrastructure components associated with said transaction steps comprises:
outputting a table data structure containing one or more entries corresponding to the identified transaction steps, wherein the one or more entries include a transaction step name of a transaction step corresponding to the entry, a name of an application supporting the transaction step corresponding to the entry, and an identifier of a data center where the application is hosted.

11. The method of claim 1, wherein identifying infrastructure components associated with said transaction steps comprises:
outputting a table data structure containing one or more entries corresponding to the identified transaction steps, wherein the one or more entries include an application identifier and at least one of an identifier of a infrastructure dependencies, an identifier of middleware dependencies, or an identifier of network dependencies.

12. The method of claim 1, wherein the first structured identifier and the second structured identifier comprise a depth level identifier that identifies a level of operation at which an associated event occurred, an event name describing a type of the associated event, a parent component identifier that identifies a parent component in the data processing infrastructure for the associated event, a business process name that identifies the business process that generated the event, and a criticality identifier that identifies a severity of the event.

13. A method for mapping events generated by infrastructure components of a data processing infrastructure with events generated by applications running in said data processing infrastructure, said method comprising:
 providing input from a plurality of probes, said input including:
 at least one event generated by an application probe, wherein the at least one event generated by the application probe identifies a performance problem with an application; and
 at least one event generated by a component probe, wherein the at least one event generated by said component probe identifies a performance problem with a component; and
 correlating said events, wherein said at least one event generated by an application probe is at least one first event that identifies a performance problem with an application, and wherein said at least one first event is represented by a first structured identifier that identifies a position of said at least one first event within said data processing infrastructure and said at least one first event's relationships and dependencies;
 said at least one event generated by a component probe is at least one second event that identifies a performance problem with a component, and wherein said at least one second event is represented by a second structured identifier that identifies a position of said at least one second event within said data processing infrastructure and said at least one second event's relationships and dependencies; and
 said correlating of said events is performed based on said first and second structured identifiers.

14. The method of claim 13, further comprising:
 representing said component and each of said events with a structured identifier;
 wherein each of said identifiers has a limited number of parameters.

15. The method of claim 14, wherein said representing further comprises employing a plurality of parameters chosen from:
 depth;
 component name;
 parent component;
 business process name;
 criticality;
 problem determination;
 destination; and
 service level agreement.

16. The method of claim 14, further comprising:
 employing said identifiers to do one or more tasks chosen from:
 inputting data;
 storing data;
 outputting data; and
 relating an event to a corrective action.

17. A system for mapping events generated by infrastructure components of a data processing infrastructure with events generated by applications running in said data processing infrastructure, said system comprising:
 means for providing input from a plurality of probes, said input including:
 at least one event generated by an application probe, wherein the at least one event generated by the application probe identifies a performance problem with an application; and
 at least one event generated by a component probe, wherein the at least one event generated by said component probe identifies a performance problem with a component and
 means for correlating said events, wherein:
 said at least one event generated by an application probe is at least one first event, and wherein said at least one first event is represented by a first structured identifier that identifies a position of said at least one first event within said data processing infrastructure and said at least one first event's relationships and dependencies;
 said at least one event generated by a component probe is at least one second event that, and wherein said at least one second event is represented by a second structured identifier that identifies a position of said at least one second event within said data processing infrastructure and said at least one second event's relationships and dependencies; and
 said correlating of said events is performed based on said first and second structured identifiers.

18. The system of claim 17, further comprising:
 means for representing said component and each of said events with a structured identifier;
 wherein each of said identifiers has a limited number of parameters.

19. The system of claim 18, wherein said means for representing further comprises means for employing a plurality of parameters chosen from:
 depth;
 component name;
 parent component;
 business process name;
 criticality;
 problem determination;
 destination; and
 service level agreement.

20. The system of claim 18, further comprising:
 means for employing said identifiers to do one or more tasks chosen from:
 inputting data;
 storing data;
 outputting data; and
 relating an event to a corrective action.

21. The system of claim 17, further comprising:
 means for identifying transaction steps involving an application; and
 means for identifying infrastructure components associated with said transaction steps.

22. The system of claim 21, wherein the means for identifying transaction steps comprises:
 means for outputting a table data structure containing one or more entries corresponding to identified transaction steps, wherein the one or more entries in the table data structure comprise a transaction step number, a transaction step name, and a description of an end user action required to execute the transaction step.

23. The system of claim 21, wherein the means for identifying infrastructure components associated with said transaction steps comprises:
 means for outputting a table data structure containing one or more entries corresponding to the identified transaction steps, wherein the one or more entries include a transaction step name of a transaction step corresponding to the entry, a name of an application supporting the transaction step corresponding to the entry, and an identifier of a data center where the application is hosted.

24. The system of claim 21, wherein the means for identifying infrastructure components associated with said transaction steps comprises:
   means for outputting a table data structure containing one or more entries corresponding to the identified transaction steps, wherein the one or more entries include an application identifier and at least one of an identifier of a infrastructure dependencies, an identifier of middleware dependencies, or an identifier of network dependencies.

25. The system of claim 17, wherein the first structured identifier and the second structured identifier comprise a depth level identifier that identifies a level of operation at which an associated event occurred, an event name describing a type of the associated event, a parent component identifier that identifies a parent component in the data processing infrastructure for the associated event, a business process name tat identifies the business process that generated the event, and a criticality identifier that identifies a severity of the event.

26. A computer-usable medium having computer-executable instructions for mapping events generated by infrastructure components of a data processing infrastructure with events generated by applications running in said data processing infrastructure, said computer-executable instructions comprising:
   means for providing input from a plurality of probes, said input including
      at least one event generated by an application probe, wherein the at least one event generated by the application probe identifies a performance problem with an application; and
      at least one event generated by a component probe, wherein the at least one event generated by said component probe identifies a performance problem with a component; and
   means for correlating said events, wherein said at least one event generated by an application probe is at least one first event, and wherein said at least one first event is represented by a first structured identifier that identifies a position of said at least one first event within said data processing infrastructure and said at least one first event's relationships and dependencies;
   said at least one event generated by a component probe is at least one second event, and wherein said at least one second event is represented by a second structured identifier that identifies a position of said at least one second event within said data processing infrastructure and said at least one second event's relationships and dependencies; and
   said correlating of said events is performed based on said first and second structured identifiers.

27. The computer-usable medium of claim 26, further comprising:
   means for representing said component and each of said events with a structured identifier;
   wherein each of said identifiers has a limited number of parameters.

28. The computer-usable medium of claim 27, wherein said means for representing further comprises means for employing a plurality of parameters chosen from:
   depth;
   component name;
   parent component;
   business process name;
   criticality;
   problem determination;
   destination; and
   service level agreement.

29. The computer-usable medium of claim 27, further comprising:
   means for employing said identifiers to do one or more tasks chosen from:
   inputting data;
   storing data;
   outputting data; and
   relating an event to a corrective action.

30. The computer-usable medium of claim 26, further comprising:
   means for identifying transaction steps involving an application; and
   means for identifying infrastructure components associated with said transaction steps.

31. The computer-usable medium of claim 26, wherein the means for identifying transaction steps comprises:
   means for outputting a table data structure containing one or more entries corresponding to identified transaction steps, wherein the one or more entries in the table data structure comprise a transaction step number, a transaction step name, and a description of an end user action required to execute the transaction step.

32. The computer-usable medium of claim 26, wherein the means for identifying infrastructure components associated with said transaction steps comprises:
   means for outputting a table data structure containing one or more entries corresponding to the identified transaction steps, wherein the one or more entries include a transaction step name of a transaction step corresponding to the entry, a name of an application supporting the transaction step corresponding to the entry, and an identifier of a data center where the application is hosted.

* * * * *